United States Patent
Kreppel

(10) Patent No.: US 7,277,397 B1
(45) Date of Patent: Oct. 2, 2007

(54) METHOD AND SYSTEM FOR HANDLING A PACKET DATA SERVICE

(75) Inventor: Jan Kreppel, Penzberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/345,812

(22) Filed: Jul. 2, 1999

(30) Foreign Application Priority Data

Jul. 6, 1998 (DE) .............................. 198 30 164
Oct. 27, 1998 (DE) .............................. 198 49 541

(51) Int. Cl.
*H04J 1/16* (2006.01)
*J04J 3/14* (2006.01)
*H04L 12/66* (2006.01)

(52) U.S. Cl. ................. 370/252; 370/352; 379/114.28; 379/114.29; 455/406; 705/52

(58) Field of Classification Search ............... 370/229, 370/230, 235, 236, 252, 253, 389, 400, 401, 370/352–356; 379/220, 230, 114.01, 114.02, 379/114.16, 114.19, 114.2, 127.05; 705/400
See application file for complete search history.

(56) References Cited

U.S. PATENT DOCUMENTS

| 5,457,736 | A | | 10/1995 | Cain et al. | |
| 5,511,113 | A | * | 4/1996 | Tasaki et al. | 379/112 |
| 5,701,301 | A | * | 12/1997 | Weisser, Jr. | 370/428 |
| 5,727,058 | A | | 3/1998 | Blumhardt et al. | |
| 5,835,484 | A | * | 11/1998 | Yamato et al. | 370/230 |
| 5,937,053 | A | * | 8/1999 | Lee et al. | 379/221.14 |
| 5,995,822 | A | * | 11/1999 | Smith et al. | 455/406 |
| 6,064,653 | A | * | 5/2000 | Farris | 370/237 |
| 6,075,783 | A | * | 6/2000 | Voit | 370/352 |
| 6,104,704 | A | * | 8/2000 | Buhler et al. | 370/352 |
| 6,144,636 | A | * | 11/2000 | Aimoto et al. | 370/229 |
| 6,266,406 | B1 | * | 7/2001 | Mercouroff et al. | 379/230 |
| 6,393,565 | B1 | * | 5/2002 | Lockhart et al. | 379/88.22 |

FOREIGN PATENT DOCUMENTS

| EP | 0 714 214 A2 | | 8/1995 |
| GB | 0866596 A2 | * | 3/1998 |
| WO | WO 97/09814 | | 3/1997 |
| WO | WO 97/26739 | | 7/1997 |

OTHER PUBLICATIONS

Digital cellular telecommunications system (Phase 2+) General Packet Radio Service (GPRS).
Digital cellular telecommunications system (Phase 2+) Customized Applications for Mobile network Enhanced Logic.
"Network and Signaling Structure Based on Personal Digital Cellular Telecommunication System Concept"; Takamura et al., May 18, 1993; p. 922-926.

* cited by examiner

*Primary Examiner*—Chirag Shah
(74) *Attorney, Agent, or Firm*—Bell, Boyd & Lloyd LLC

(57) ABSTRACT

A method and system for handling a packet data service wherein, proceeding from the handling of a packet data service by a service network node of a packet data network to which communication terminal equipment is connected for the transmission of packet data, it occurs that a data switching function of an interworking of the packet data service with network functions of an intelligent network is interconnected to the service network node, and the setting of at least one threshold for the packet data transmission is undertaken by the service control function for monitoring a packet data stream in the packet data network wherein the service control function communicates this threshold to the service switching function.

12 Claims, 2 Drawing Sheets

METHOD AND SYSTEM FOR HANDLING A PACKET DATA SERVICE

BACKGROUND OF THE INVENTION

1. Field of the Invention

The present invention is directed to a method and system for handling a packet data service wherein, proceeding from the handling of a packet data service by a service network node of a packet data network to which communication terminal equipment is connected for the transmission of packet data, it occurs that a data switching function of an interworking of the packet data service with network functions of an intelligent network is interconnected to the service network node, and the setting of at least one threshold for the packet data transmission is undertaken by the service control function for monitoring a packet data stream in the packet data network.

2. Description of the Prior Art

As is known, it is possible to have control of the connection implemented by an intelligent network (IN) for connection-oriented communication services in a communication network. For mobile radio telephone networks according to the GSM standard (global system for mobile communication), for example, a CAMEL platform (customized applications for mobile network enhanced logic) is defined according to GSM Recommendation 03.78 in order to enable worldwide use of the performance features of the intelligent network. The standard architecture of the intelligent network provides both a service switching function and a service control function that are connected to one another via a signaling link. A specific protocol that exists for the mobile radio telephone network from the CAP protocol (CAMEL application part) is thereby employed.

New data services such as the packet data service GPRS (general packet radio service) according to the GSM Recommendation 03.60 currently are being introduced in mobile radio telephone networks according to the GSM standard. The transmission in the mobile radio telephone network thereby occurs not connection-oriented but in the form of packet data. This type of transmission utilizes the given transmission resources in the mobile radio telephone network better. Packet-oriented transport services also are favored for mobile radio telephone networks of the next generation (UMTS, universal mobile telecommunication systems). Given connection-oriented services, it is well known that the duration of the connection can be measured and that the charging of the connection according to the respective, current fee schedule (for example, upon utilization of an IN service) can be implemented. Given packet-oriented services that govern packet data streams, it is not meaningful to transmit a message per packet between packet data network and intelligent network for the charging, since this would lead to a considerable signaling load.

SUMMARY OF THE INVENTION

An object of the present invention, therefore, is to specify a method and a mobile radio telephone network with which the packet data stream can be monitored in terms of a mount with an intelligent network in the handling of a packet-oriented service.

Proceeding from the handling of a packet data service by a service network node of a packet data network to which communication terminal equipment is connected for the transmission of packet data, it inventively occurs that: (a) an interworking of the packet data service with network functions of an intelligent network, whereof a service switching function is interconnected to the service network node and a service control function is connected to the service network node with integrated service switching function; and (b) the setting of at least one threshold for the packet data transmission by the service control function that communicates this threshold to the service switching function.

Only on the basis of the combination of (a) integration of the service switching function in the respective service network node; (b) communication with the service control function; and (c) setting a threshold, can the packet data service advantageously be handled and controlled like other IN services, and can the packet data stream according to the packet-oriented service be simply and economically monitored via the intelligent network functions. The signaling outlay is reduced to a minimum since the threshold for the successive transmission of a plurality of packets merely has to be set and communicated to the IN control function. The IN switching function waits for this threshold to be reached or, respectively, exceeded. Only thereafter are signaling messages exchanged for further procedures.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
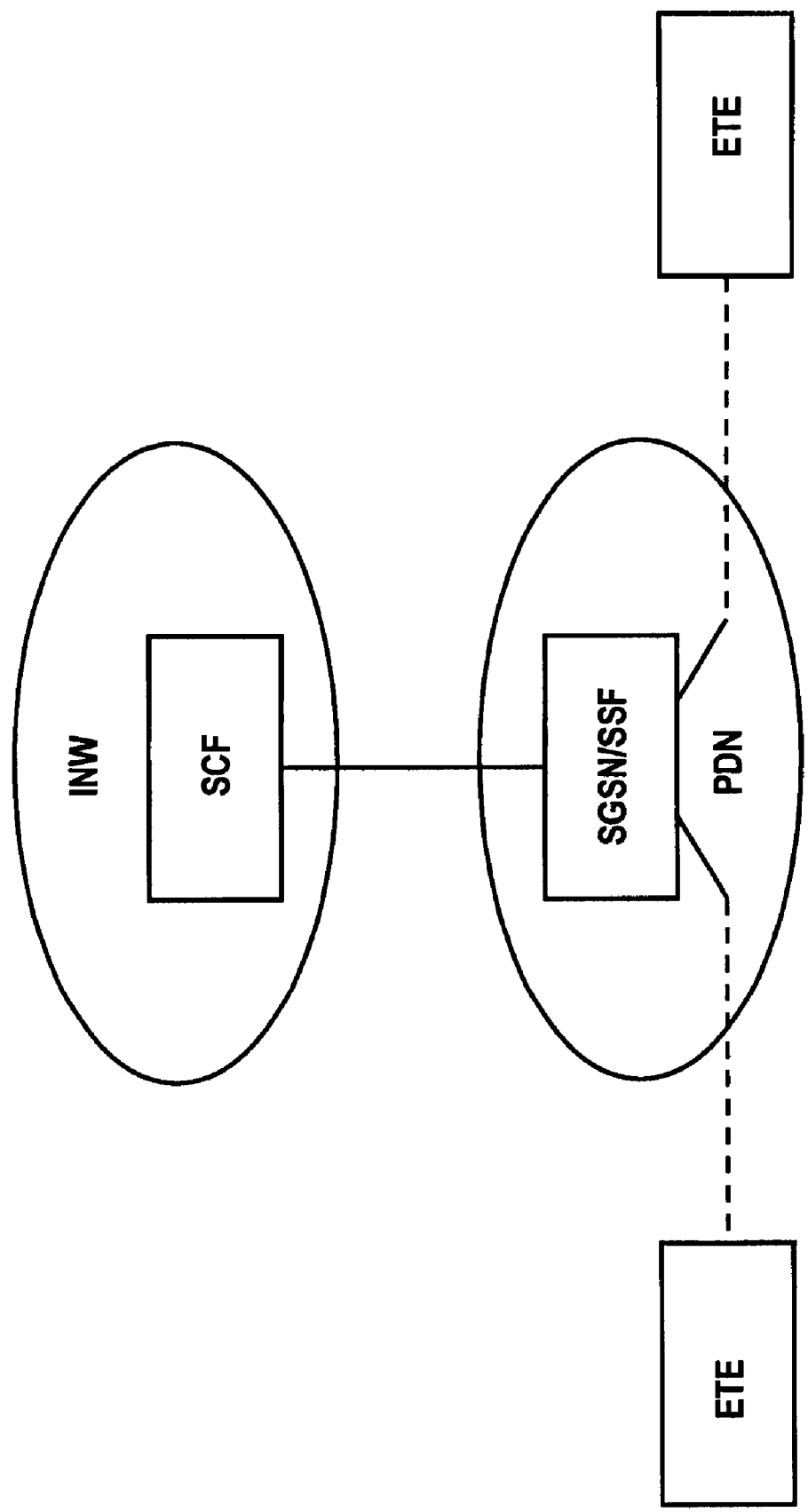
FIG. 1 shows network devices of a packet data network and of an intelligent network for handling a packet data service according to the present invention.

In the block circuit diagram of FIG. 1, the network equipment of a packet data network PDN and of an intelligent network INW for handling a packet data service are shown wherein thresholds for monitoring packet data streams are set according to the present invention. Only those pieces of network equipment of the respective communication networks of significance for the present invention are thereby shown. Exemplary applications of the present invention are directed to the interworking of the packet data service GPRS (general packet radio service), according to the GSM standard in a mobile radio telephone network and with intelligent network functions, or the interworking of a packet-oriented service in a mobile radio telephone network according to UMTS (universal mobile telecommunication systems), with intelligent network functions.

The packet transmission in the packet data network PDN occurs in packet-oriented fashion in a corresponding network node, wherein a service switching function SSF of the intelligent network INW is integrated in this network node. For the example of the GPRS service, this network node is composed of the service network node SGSN (serving GPRS support node) that services communication terminal equipment located in its coverage area. The communication terminal equipment referenced ETE in FIG. 1, which is connected to the packet data network PDN for packet data transmission, includes mobile stations used by mobile subscribers for the above example. The two IN functionalities mutually exchange information and messages via an interface from the service switching function SSF to the service control function SCF of the intelligent network INW. Let it be assumed that the packet data stream leads from one communication terminal equipment ETE to another communication terminal equipment ETE, wherein both pieces of terminal equipment can send and receive data packets via the network PDN. According to the present invention, it is provided to implement an interworking between the packet data network PDN, that acts as packet-oriented transport network, and the intelligent network INW in order to monitor the packet data stream with the intelligent network INW in terms of amount.

There is a mechanism in the intelligent network INW that makes it possible to monitor specific events in a base network in the packet data network PDN in the present example. To this end, detection points are defined and the intelligent network INW can inform the base network what detection points are to be monitored. When an event occurs for which such a detection point is defined, this is communicated to the intelligent network INW. This can occur as a message (notification) or as a request, whereby the base network expects further instructions.

A new detection point that indicates whether a certain threshold in the previously-transmitted packet data volume was at least reached or exceeded is defined for packet data streams according to the packet data service. The service control function SCF of the intelligent network INW sets a threshold for measuring the packets transmitted in the packet data stream and communicates the following information in view of the packet data service to the network node, for example SGSN, with integrated service switching function SSF:

The identification of the packet data stream in the form of the address of the sender and/or of the receiver of packets. This, for example, can be an IP address (Internet Protocol) in case of packet data transmission via the Internet or, on the other hand, some other subscriber identification that allows the packet data network PDN to unambiguously allocate the packets. In the case of the packet data service GPRS in a GSM network, the identification is composed of the international mobile subscriber identifier (IMSI) of the mobile subscriber.

The height of the threshold. When the plurality of transmitted packets in the packet data network PDN (for example, from the network node) reaches this threshold, then a message or, respectively, notification occurs to the intelligent network INW.

The property of measuring the transmitted packets. The measurement can be undertaken either absolute, i.e. since the beginning of the packet data transmission, or relative, i.e. since the most recent transgression of the threshold that was set.

The property of the measured value. Either of the plurality of packets or the amount of data transmitted overall can be measured (for example, in bites).

The required reaction of the packet data network PDN or, respectively, of its network node (for example, SGSN) when the threshold is reached or exceeded. It is thereby possible to merely report the transgression of the threshold or to no longer allow any further data transmission after the threshold has been exceeded.

The desired reaction of the packet data network PDN or, respectively, of its network node (for example, SGSN) when the threshold is exceeded with respect to further measurement. According to a first version, the measurement is to be implemented only once, whereas the measurement is restarted after each transgression of the threshold in an alternate version.

The transmission direction of the packet data stream to be measured.

The measurement can occur either only for the packets incoming for the subscriber or, respectively, the subscriber's communication terminal equipment ETE or only for the packets outgoing from the subscriber or, respectively, the subscriber's communication terminal equipment ETE. Further, it may occur for incoming and outgoing packets in both directions.

A time interval, preferably monitored by the service switching function SSF, within which the threshold transgression can be identified. In this case, the time interval is communicated to the service switching function SSF by the service control function SCF when the threshold is set. After the expiration of the time interval, the measurement is restarted by the service switching function SSF. In this type of measurement, the time interval according to an alternative solution also can be monitored by the service control function SCF that restarts a time measurement after a message has been sent to the service switching function SSF.

The service control function SCF according to the IN principle includes means therefor that set the threshold and that offer and define other information as well as means that communicate such information to the service switching function SSF. These means can be standard transmission/reception devices and processing devices such as, for example, processors. Such processing and transmission/reception equipment is also provided in the service switching function SSF according to the IN principle for a communication with other functions or, respectively, network equipment and for the implementation of the method steps according to the present exemplary embodiment.

Figure 2:
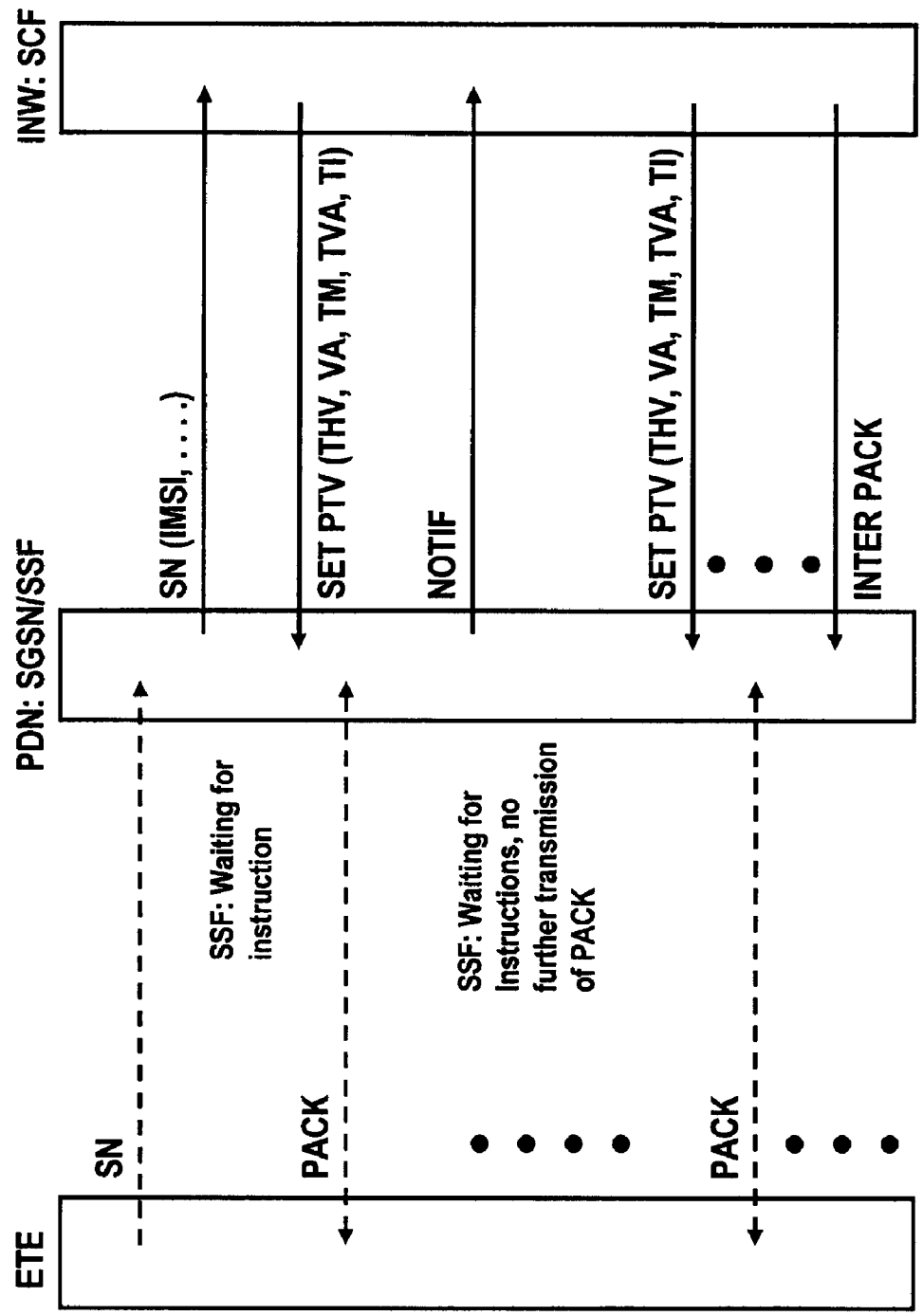
FIG. 2 shows the message flow for an interworking between the network devices for monitoring packet data streams.

FIG. 2 shows the message flow between the network equipment and the communication terminal equipment for monitoring the packet data streams. First, a start message SN is generated by the communication terminal equipment ETE and conducted, via network equipment that is not shown, to the service switching function SSF integrated in the network node SGSN. The start message SN is then transmitted from the latter between the service switching function SSF and the service control function SCF in the intelligent network INW. The start message SN can be a signaling message with which a packet transmission is initiated; for example, the activation of a packet data protocol given the packet data service GPRS. However, it likewise can be part of a first packet transmission. The setting of a threshold in the following step can occur independently of the start message SN. A start message to the intelligent network INW likewise can be foregone, namely when the service control function SCF has already set a threshold in advance. The start message SN to the service control function SCF, in addition containing other information, contains subscriber identification that allows the packet data network PDN to unambiguously allocate the packets. In a case of the packet data service GPRS in a GSM network, the identification is composed of the international mobile subscriber identifier IMSI of the mobile subscriber.

The service control function SCF sets a packet threshold value THV. Over and above this, it preferably defines one or more parameters such as, for example, the value VA of the threshold, the type TVA of the threshold as measured value, the property TM (type of measurement) of the measurement and a time interval TI within which reaching or, respectively, exceeding the threshold can be identified. In a message SET PTV (setup package threshold value), it communicates the threshold value THV and, potentially, the additional parameters VA, TVA, TM to the service switching function SSF. The service switching function SSF waits for instructions, can discard or queue arriving packets as long as a threshold has not yet been set, or can immediately continue the handling of the service with the packet transfer.

The transmission of the packets PACK occurs between the communication terminal equipment ETE and the service switching function SSF. As soon as the service switching function SSF has identified that the set threshold value THV has been reached or exceeded, it reports this to the service control function SCF by sending a message NOTIF (notification). The further transmission of packets PACK is interrupted. Dependent on the type of measurement, the service switching function SSF waits for instructions. When the service control function SCF again sets a packet threshold, by sending a further message SET PTV with at least one threshold THV potentially supplemented by one or more of the parameters VA, TVA TM, the packet data stream with the packet transmissions between communication terminal equipment ETE and service switching function SSF is resumed. This procedure can be repeated until the packet data transmission is ultimately ended by the service control function SCF wherein it sends an interrupt message INTERR PACK (interruption of packet transmission) to the service switching function SSF.

The above mechanism consequently can be used for an online charging of packet data services. In the GPRS network, a packet data transmission is requested by the user with a mobile terminal equipment. To this end, a packet data protocol is activated. Given this activation, the intelligent network is engaged wherein it initially decides whether the user is authorized to use the packet data protocol with the required service quality (quality of service) and whether there is adequate account coverage for using this service. When yes, the activation is started and a first threshold is set for monitoring the packet data stream. Subsequently, the transmission begins in the base network. As soon as the threshold is reached, the base network sends a message to the intelligent network. This determines the incurred fees dependent on the volume, the fee schedule valid at the time, the quality of service, etc. The amount that has been incurred is then subtracted from the account. When the account continues to exhibit adequate coverage, the threshold is reset; otherwise, the base network is instructed to allow no further packet transmissions. The method also can be used for a monitoring of the individual packet data streams in order, for example, to recognize and prevent individual users from excessively overloading the network or overloading it beyond their authorization.

Although the present invention has been described with reference to specific embodiments, those of skill in the art will recognize that changes may be made thereto without departing from the spirit and scope of the invention as set forth in the hereafter appended claims.

I claim:

1. A method for online charging of a packet data service in a system having at least one service network node of a packet data network to which communication terminal equipment is connected for the transmission of packet data, the method comprising the steps of:
   interworking the packet data service with network functions of an intelligent network wherein a service switching function is integrated with the at least one service network node and a service control function is connected to the service network node with the integrated service switching function;
   setting at least one threshold for the packet data transmission by the service control function for monitoring a packet data stream in the packet data network;
   communicating the threshold to the service switching function;
   determining when the threshold is reached;
   implementing a measurement of transmitted packets via the service switching function;
   sending a message concerning the measurement to the service control function; and
   determining incurred fees dependent on the measurement by the intelligent network.

2. A method for online charging of a packet data service as claimed in claim 1, further comprising the steps of:
   stopping a further transmission of packets in the packet data stream when said threshold has been reached.

3. A method for online charging of a packet data service as claimed in claim 1, further comprising the step of:
   communicating along with the threshold one or more parameters in view of the threshold and the measurement of at least one of the plurality of transmitted packets and the quantity of data transmitted overall.

4. A method for online charging of a packet data service as claimed in claim 3, further comprising the step of:
   indicating the value of the threshold with one parameter.

5. A method for online charging of a packet data service as claimed in claim 3, further comprising the step of:
   indicating with one parameter a property of the measurement as to whether the measurement begins from a beginning of the packet data transmission or since a last time the threshold was reached.

6. A method for online charging of a packet data service as claimed in claim 3, further comprising the step of:
   indicating with one parameter a property of the threshold as a measured value as to whether the plurality of transmitted packets or the data set transmitted overall is measured.

7. A method for online charging of a packet data service as claimed in claim 3, further comprising the step of:
   specifying with one parameter a time interval within which the measurement of the plurality of transmitted packets or the quantity of data transmitted overall occurs.

8. A method for online charging of a packet data service as claimed in claim 7, further comprising the steps of:
   monitoring the time interval with the service switching function;
   starting again the measurement after the expiration of the time interval; and
   restarting the time interval.

9. A method for online charging of a packet data service as claimed in claim 7, further comprising the step of:
   monitoring the time interval with the service control function.

10. A method for online charging of a packet data service as claimed in claim 1, further comprising the step of:
    restarting the monitoring every time the threshold is reached.

11. A method for online charging of a packet data service as claimed in claim 1, further comprising the step of:
    having the service switching function wait for instructions of the service control function after communicating that the threshold has been reached and before the service switching function continues.

12. A system for online charging of a packet data service by at least one service network node of a packet data network to which communication terminal equipment is connected for transmission of packet data, and for interworking of the packet data service with network functions of an intelligent network, the system comprising:
- a service switching function interconnected to the service network node;
- a service control function connected to the service network node with integrated service switching function, the service control function further comprising means for setting at least one threshold for monitoring a packet data stream in the packet data network and means for communicating the threshold to the service switching function
- means for measuring the plurality of transmitted packets and the quantity of data transmitted overall;
- means for sending a message to the service control function when the threshold is reached; and
- means for determining incurred fees dependent on the plurality of transmitted packets and the quantity of data transmitted overall.

\* \* \* \* \*